United States Patent [19]
Jett et al.

[11] 3,758,823
[45] Sept. 11, 1973

[54] BATTERY POWERED FLUORESCENT LIGHT

[75] Inventors: Preston L. Jett; James T. Hutchinson, Jr., both of Huntsville, Ala.

[73] Assignee: Jettson Engineering Company, Inc., Huntsville, Ala.

[22] Filed: Dec. 23, 1971

[21] Appl. No.: 211,208

[52] U.S. Cl. ...... 315/219, 315/DIG. 5, 315/DIG. 7, 331/113 A
[51] Int. Cl. .......................................... H05b 37/02
[58] Field of Search .............. 315/DIG. 5, DIG. 7, 315/219; 331/113 A

[56] References Cited
UNITED STATES PATENTS

| | | | |
|---|---|---|---|
| 3,249,799 | 5/1966 | Powell, Jr. | 315/DIG. 7 |
| 3,284,724 | 11/1966 | Marlow | 331/113 A |
| 3,505,562 | 4/1970 | Engel | 315/DIG. 7 |

*Primary Examiner*—Roy Lake
*Assistant Examiner*—Lawrence J. Dahl
*Attorney*—B. B. Olive

[57] ABSTRACT

A battery powered transistor inverter circuit operates a fluorescent light without requiring a capacitor ballast or starting filament current and is enclosed with the light in a waterproof, shock resistant, light transmitting case.

12 Claims, 5 Drawing Figures

PATENTED SEP 11 1973 3,758,823

INVENTORS
PRESTON L. JETT
BY JAMES T. HUTCHINSON, JR
B. B. Olive
ATTORNEY

BATTERY POWERED FLUORESCENT LIGHT

BACKGROUND OF THE INVENTION

1. Field of the Invention

The invention relates to transistor inverter circuits and particularly to portable, battery operated, fluorescent lights.

2. Description of the Prior Art

The use of transistor inverter circuits has been an efficient way to obtain alternating current from a direct current supply. Circuits of this kind which have been devised to date suitable for operation with electric discharge lamps have utilized generally complex and expensive switches, ballasts, capacitors, or starters to provide the initial voltage necessary to start the lamp, and the steady current supply required to keep it operating. U.S. Pat. Nos. 2,668,229, 2,871,409, 2,971,126, 3,084,283, 3,005,130 and 3,247,422 exemplify the art.

SUMMARY OF THE INVENTION

The battery powered fluorescent light of the invention uses a transistor inverter circuit which is solid state in nature. A battery of suitable voltage provides power to the inverter circuit and to which is connected a gas discharge lamp. A conductor mounted in close proximity to the lamp causes a portion of the gas within to become partially ionized. This enables the device to instantly start the lamp as soon as voltage is applied. In addition, the oscillation of the circuit is achieved without the usual ballasting techniques, and constant power is always delivered to the lamp. The circuitry is therefore ideal for operating a gas discharge tube or other device which exhibits a negative resistance because no special starters or ballasts are required. Further, in a preferred embodiment the circuit and lamp are mounted in a light transmitting, waterproof, shockproof enclosure.

DESCRIPTION OF THE PREFERRED EMBODIMENT

Figure 1:
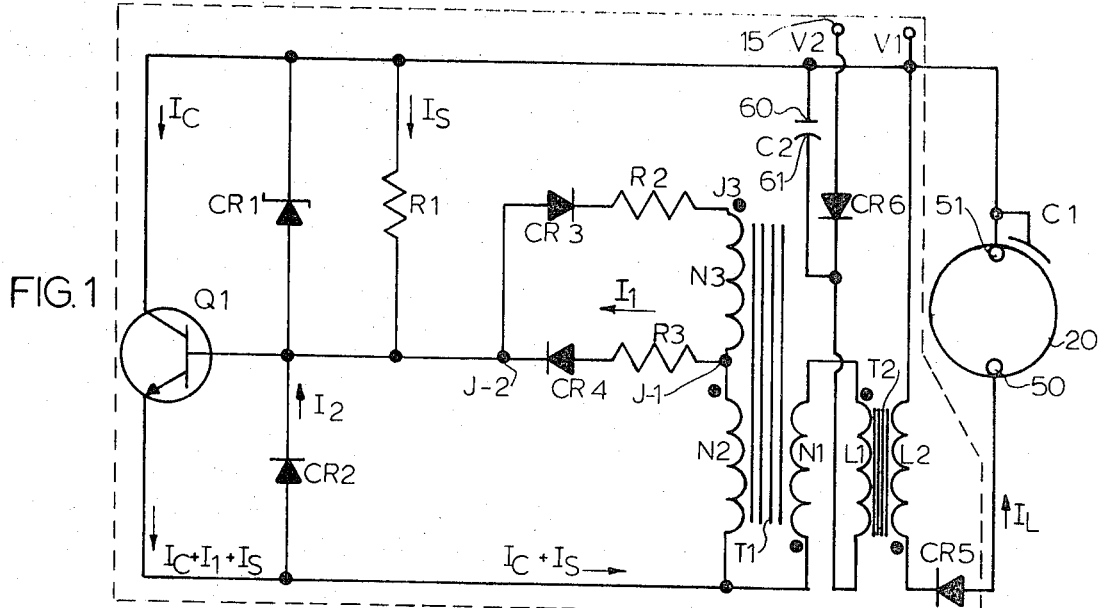
FIG. 1 is a circuit diagram of the invention circuit.

The circuit schematic shown in FIG. 1 consists in general of an inverter circuit which acts as an oscillator and converts a direct current supply to alternating current. The circuit includes transistor Q1, six diode rectifiers CR1 through CR6, electrolytic capacitor C2 having a negative electrode 60 and a positive electrode 61, a conductor exhibit characteristics of a capacitor C1, resistors R1, R2, R3, current transformer T1, transformer T2, and an elongated gas discharge tube 20. The direct current supply V, which suitably may be a 12-volt battery, is connected across input terminals V1, V2 corresponding to the indicated polarity and may include a switch, not shown. Diodes CR3, CR4 and resistors R2, R3 provide a current limiting network having input junctions J-1, J-3 and an output junction J-2. Terminals 50, 51 effectively constitute the load terminals.

Each diode, CR1-CR6, has the usual forward and back junctions which will be understood as being respectively ahead of the symbolic transverse line and being the symbolic triangle. Transistor Q1 is of the n-p-n junction type and includes the emitter electrode represented by the angled line with arrowhead, the collector electrode represented by the angled line with arrowhead, the collector electrode represented by the plain angled line, and the base electrode represented as the straight line junction of the emitter and collector. The transistor is turned on by forward biasing the base electrode with the appropriate current supply to the base. When Q1 becomes "saturated" it is not conducting current from collector to emitter with a very low voltage drop from collector to emitter.

Current transformer T1 is a transformer that is driven from a current source rather than a voltage source. Windings N1, N2 and N3 are wound on a common saturating core. N1 is termed the primary and N2 and N3 are termed the secondary windings. The term "dual inductor" best described transformer T2 and means an inductor with two windings, primary L1 and secondary L2, sharing a common magnetic core.

Figure 2:
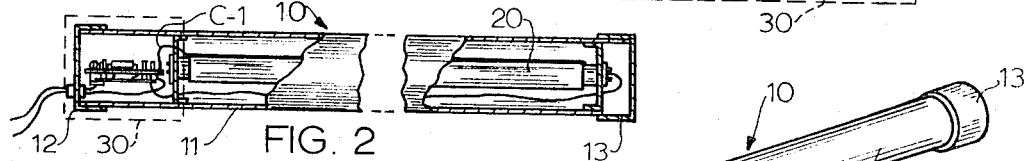
FIG. 2 is a cross section, partially cutaway view, of the entire unit showing the circuitry as well as the gas discharge tube and enclosure.
Figure 3:
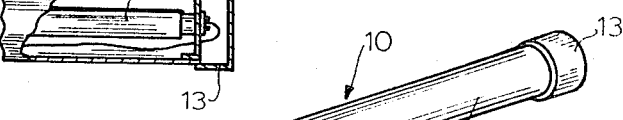
FIG. 3 is a perspective outside view of the invention showing connections for a battery and on-off switch.

The housing 10 consists of a light transmitting, preferably translucent, plastic cylinder 11, with end cups 12, 13 suitably sealed for waterproofing the cylinder 11 at each end as shown in FIGS. 2 and 3. Both the circuitry indicated by dashed line box 30 and lamp 20 are housed within housing 10, and appropriate external leads 15 connect the circuitry through an on-off switch 16 to an external battery, not shown. Provision is made for the shock resistant mounting of the circuitry as well as the tube 20 within housing 10, such that the device will not sustain breakage if dropped. This has been accomplished by mounting the circuitry on a printed circuit board, the dimensions of which cause it to fit snugly inside the housing, and by mounting each of the tube terminals in disk-shaped supportive members which also fit snugly inside the housing. Although the housing used with this particular invention is cylindrical and made of plastic, it may be constructed of material other than plastic and may exhibit a shape other than cylindrical, so long as it will emit light through a clear or translucent surface and will satisfactorily support and waterproof the contents. Of course, where waterproofing is not a consideration the circuit may be used to operate the light in an exposed fixture.

Operation of the circuit is next explained and it will be understood that the component values and operating characteristics are selected to effect the operation that will be described. The dots adjacent the windings indicate the relatively positive ends of the windings, the undotted ends being the relatively negative ends.

Initially V=0 and transistor Q1 is off. When V, e.g. 12 volts D.C., is applied to terminals V1, V2, current $I_s$ flows through resistor R1 and into the base of transistor Q1 thereby forward biasing transistor Q1 and causing transistor Q1 to start to conduct current, $I_c$ through windings N1 of transistor T1 and windings L1 of transformer T2. Because transformer T1 is a current transformer the current, $I_c$, flowing through windings N1 of transformer T1 causes a current, $I_1$, that is proportional to $I_c$ to flow through winding N2 of transformer T1 and to bias transistor Q1 into saturation.

With transistor Q1 saturated the direct current source is effectively connected across winding L1 of transformer T2. The winding L1 of T2 now acts as an inductor because the phase of winding L2 of transformer T2 causes rectifier-diode CR5 to be reversed biased while transistor Q1 is one. As long as transistor Q1 is saturated and $I_c$ continues to flow, no energy is delivered to the gas discharge tube 20 because rectifier-diode CR5 is reversed biased. As $I_c$ continues to flow through winding L1 of transformer T2, energy is stored in the magnetic field of transformer T2. The amount of energy stored in transformer T2 is equal to one-half the inductance of winding L1 of transformer T2 times the square of the peak value that $I_c$ (i.e. $I_c + I_s$) attains before transformer Q1 is switched off. ($W = \frac{1}{2} L_{L1} (I_c + I_s)^2$)

Continuing with the saturation of transformer T1 and storage of energy in the magnetic field of T2, transistor Q1 remains saturated until winding N1 of transformer T1 will no longer support the voltage across it and the core of transformer T1 saturates. When the core of transformer T1 saturates, bias current, $I_1$, supplying transistor Q1 is diminished, causing transistor Q1 to turn off. As transistor Q1 turns off, $I_c$ is suddenly stopped causing a polarity change across winding N2 and N3 of transformer T1 and winding L2 of transformer T2 due to the flux change in the core of transformers T1 and T2 respectively. Rectifier CR5 now becomes forward biased and the base of transistor Q1 becomes reversed biased keeping transistor Q1 turned off.

The voltage across winding L2 of transformer T2 will rise to whatever level is necessary to cause gas discharge tube 20 to ionize. The current into gas discharge tube 20 is limited by the inductance of winding L2 of transformer T2. Current will continue to flow in winding L2 of transformer T2 and into gas discharge tube 20 until the energy stored in the magnetic field, while transistor Q1 was on, is delivered by winding L2 of transformer T2 through rectifier CR5 to the gas discharge tube or until transistor Q1 is again turned on causing rectifier CR5 to be reverse biased. Capacitor C2 has its positive electrode 60 connected to the collector electrode of transistor Q1 and its negative electrode 61 to a common junction with winding L1 and operates as a low pass filter and to feed the current ($I_c + I_s$) required to store energy in T2 during Q1 on time.

Transistor Q1 remains off as long as its base is reverse biased by the change in polarity in winding N2 and N3 of transformer T1. The polarity change of winding N2 and N3 of transformer T1 causes rectifier CR4 to become reverse biased and current $I_2$ flows through rectifiers CR2, CR3, resistor R2 and winding N2 and N3 of T1. $I_2$ will continue to flow keeping transistor Q1 turned off until the energy stored in the magnetic field of transformer T1 is dissipated. When the storage energy of transformer T1 is completely dissipated the voltage across windings N2 and N3 of T1 will go to zero and the transistor Q1 base will no longer be reverse biased. The current, $I_s$, flowing through resistor R1 is no longer diverted through rectifier CR3, resistor R2 and winding N2 of transformer T1, but will now flow into base of transistor Q1 causing the cycle to repeat again.

A protective feature is noted in that the described circuit will not be damaged if the direct current supply is connected backwards because in such event the rectifier CR6 becomes reverse biased and prevents the circuit components from being damaged by the incorrect voltage polarity. The transistor Q1 and the windings L1 and L2 of transformer T2 are also protected against damage should the gas discharge tube 20 be inadvertantly removed from the circuit during operation. This further protection is afforded by rectifier CR1 which is a zener diode whose breakdown voltage is equal to the voltage rating of transistor Q1. Thus, should the gas discharge tube 20 be removed, the voltage across winding L1 and L2 of transformer T2 will rise to a level that will cause zener diode CR1 to conduct and supply bias current to the base of transistor Q1. Transistor Q1 will therefore become biased on and the voltage carried across winding L1 and subsequently winding L2 of transformer T2 will be maintained at a level that will neither damage transistor Q1, nor allow excessive voltage across winding L2 to arc and damage transformer T2. The use of zener diode CR1 is optional and when employed conveniently allows the use of less expensive transistors which could not normally be used to switch inductive loads of the kind involved here.

C1 in the preferred embodiment is a wire conductor that is attached to one end of the gas discharge tube 20 and extends alongside tube 20 in close proximity therewith. An aluminum foil sheet may also be employed. C1 thus acts as a capacitor allowing small amounts of current to conduct from the negative end of the gas discharge tube 20 to C1 which is grounded. The small current will cause the gas in the gas discharge tube 20 near C1 to ionize as soon as the circuit begins oscillation and subsequently aids in ionizing all of the gas in the gas discharge tube 20. Conductor C1 therefore enables the gas discharge tube 20 to ionize instantly without filaments current and at a lower voltage than normally required. The use of conductor C1 in conjunction with other circuitry described thus eliminates the need for the conventional starters, buttons, switches or special ballast circuits that are normally required to start the gas discharge tube and allows use of a lower voltage battery.

The circuit delivers constant power to the lamp because the frequency of operation, the time transistor Q1 is saturated, is independent of the load and is controlled completely by the action of transformer T1. Therefore, the time transistor Q1 is "on" is constant regardless of the load impedance. The ratio of transistor Q1 "on" time to transistor Q1 "off" time is therefore fixed. The fact that transistor Q1 "on" time is constant or the same for each cycle means that the direct current source is effectively connected through transistor Q1 to the "inductor" L1 of tranformer T2 for a fixed or constant period of time for each cycle. This action insures that the peak current in the inductor L1 of transformer T2 will be the same for each cycle. Therefore, if the peak current in the inductor is the same for each cycle, the energy stored in the inductor L1 of transformer T2 is the same from cycle to cycle, the energy stored being $W = \frac{1}{2} L_{L1} I_c^2$ for each cycle. Because each cycle is the same or constant, the power subsequently delivered to the load by the inductor L2 of transformer T2 is also constant.

It should be noted that the circuit can be designed to operate in basically two modes. One mode is that in which the energy stored in winding L1 of transformer T2 is completely dissipated through rectifier CR5 and winding L2 of transformer T2 before the next cycle. The other mode is that in which all of the energy stored in winding L1 of transformer T2 has not had time to be dissipated in the load through rectifier CR5 and winding L2 of transformer T2 before the next cycle of operation. The latter mode will not necessarily deliver a constant power to any load. In any case the main power delivering device transformer T2 is not allowed to saturate to achieve oscillation whereas the base drive current transformer T1 is allowed to saturate. Because T2 does not saturate means that transistor Q1 switches relatively low current spikes and therefore can be relatively small and inexpensive.

It can also be seen that $I_1$, the current flowing through winding N2, resistor R3, rectifier CR4, and the base-emitter of transistor Q1 is proportional to $I_c$, the current flowing through collector-emitter of transistor Q1, winding N1, winding L1, and rectifier CR6. This means that the ratio of current $I_1$, the base current of transistor Q1, to current $I_c$, the collector current of transistor Q1, is fixed by the turns ratio of winding N1 and winding N2 of transformer T1. This method of supplying bias to transistor Q1 thus insures low voltage drop from collector to emitter of transistor Q1 while transistor Q1 is biased on and therefore increases overall circuit efficiency. $I_2$, the current through winding N2 of transformer T1 will continue flowing as long as current $I_c$ conducts through winding N1 of transformer T1, or until the core material of transformer T1 saturates or will no longer support the storage across winding N1 of transformer T1.

Figure 4:
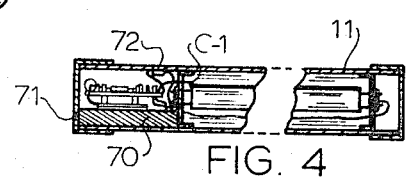
FIG. 4 is a cross section, partially cutaway view, showing a second embodiment having a self-contained battery.
Figure 5:
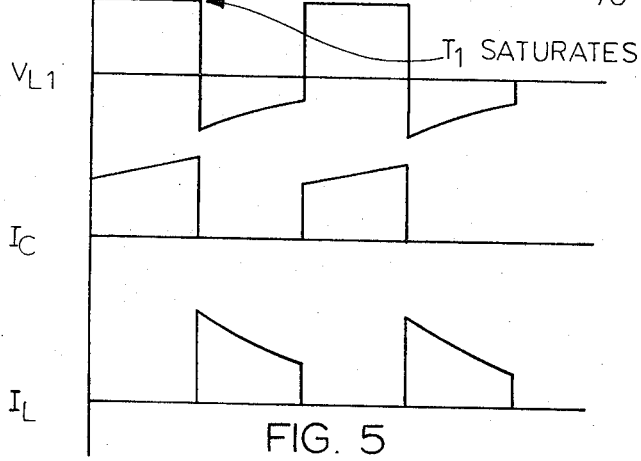
FIG. 5 is a pulse diagram.

In FIG. 4, a rechargeable battery 70, the power source, is enclosed in housing 11 and is connected to a suitable recharging connection 71 available for external connection. The housing 11 is preferably sufficiently flexible so that an on-off switch 72 may be operated simply by pressing on the sides of the housing 11 and the various components are suitably wired together. Thus, in this embodiment the invention can effectively become a self-contained "light stick" and the battery can be recharged as necessary from time to time by connecting connection 71 to a suitable recharging source.

Circuit components may vary and still perform according to the invention. R1 should be greater than 100 ohms, R2 less than 500 ohms and R3 less than 50 ohms. In a specific embodiment, C-1 was a wire conductor attached to the lamp, C2 was rated 100$\mu$f at 15 volts DC, R1 was 1,000 ohms, R2 was 0.0 ohms, R3 was 0.0 ohms, T1 had a ferrite torroid core, N1 was 2 turns of 24 AWG, N2 was seven turns of 24 AWG, N3 was two turns of 24 AWG, T2 had a ferrite pot core, L1 was six turns of 24 AWG, L2 was 50 turns of 28 AWG, Q1 was a silicon NPN transistor, CR1 was a silicon zener diode and CR2-CR6 were silicon rectifiers.

In further explanation of another aspect of the invention it is noted that N3 winding stores energy the same as winding N2. It has been found that without the N3 winding any change in turns on winding N2 affected both "off" and "on" time whereas with winding N3 a change of turns on N3 can be made to change "off" time without affecting the "on" time of transistor Q1. Resistors R1, R2 and R3 may be used for such adjusting but the use of N3 offers many advantages.

What is claimed is:

1. In a battery powered fluorescent light device, in combination:
    a. a direct current power source having positive and negative terminals;
    b. a transistor inverter circuit having first and second load terminals and comprising:
        1. a transistor having base, collector, and emitter electrodes with the collector electrode being connected to said positive terminal;
        2. a first zener diode having a forward junction connected to said collector electrode and a back junction connected to said base electrode and having a breakdown voltage equivalent to the voltage rating of said transistor;
        3. a second rectifier diode having a forward junction connected to said base electrode and a back junction connected to said emitter electrode;
        4. a first current limiting resistor connected in parallel with said first zener diode;
        5. a current limiting diode-resistor network having parallel branches each including a diode in inverse parallel to the diode of the other branch and a resistor and having a first terminal of said network connected to said base electrode;
        6. a first saturating current transformer having a first primary and second and third secondary windings on a common saturable magnetic core, said primary and said second secondary windings having respective positive and negative ends connected together and to said emitter electrode, the respective positive and negative ends of the second and third secondary windings being connected together and to a second terminal of said network and to said base electrode, said third secondary winding having its negative end connected to said second terminal and being in series in one branch of said network;
        7. a second transformer having a saturable magnetic core with first and second windings arranged thereon in a dual inductor relationship with the positive end of the first winding of the second transformer being connected to the negative end of the primary winding of the first transformer and the negative end of the secondary winding of the second transformer being connected to said positive terminal;
        8. a fifth rectifier-diode having its forward junction connected to the positive end of said second transformer secondary winding and its back junction connected to said first load terminal;
        9. a sixth rectifier-diode having its back junction connected to said negative terminal and its forward junction connected to the negative end of said second transformer first winding;
        10. a capacitor having positive and negative electrodes with the negative electrode being connected to a common junction between said sixth rectifier-diode and the negative end of said second transformer first winding and with the positive electrode being connected to said collector electrode;
        11. an elongated conductor having the functioning qualities of a capacitor and connected on one side of said second load terminal; and
    c. a load circuit consisting of a gas discharge lamp with appropriate filament windings being connected in series with said load terminals and in close proximity to said conductor whereby said conductor acts as a capacitor with respect to said lamp and said lamp becomes energized when said power source is connected to said terminals and whereby said conductor becomes slightly energized and provides the ionization of sufficient gas particles inside the lamp to substantially instantly start said lamp when current is initially applied, and wherein said lamp draws stored current from said second transformer with each oscillation of said inverter circuit.

2. A light device as claimed in claim 1 wherein said conductor is in the nature of a wire.

3. A light device as claimed in claim 1 wherein said conductor is in the nature of a thin metal sheet.

4. A light device as claimed in claim 2 including a light transmitting housing internally mounting said lamp and circuit and having leads extending therefrom connectable to said power source.

5. A light device as claimed in claim 3 including a light transmitting housing internally mounting said lamp and circuit and having leads extending therefrom connectable to said power source.

6. A light device as claimed in claim 1 including a light transmitting housing mounting said source, circuit and lamp and including a switch operable externally of said housing and arranged to start and stop operation thereof.

7. A light device as claimed in claim 6 wherein said circuit is mounted on a printed board and said lamp and board are shock mounted internally of said housing.

8. A light device as claimed in claim 7 wherein said circuit is mounted on a printed board and said lamp and board are shock mounted internally of said housing.

9. A light device as claimed in claim 1 wherein said capacitor is of an electrolytic type.

10. In a fluorescent lamp circuit, in combination:
   a. a direct current source having positive and negative terminals;
   b. a dual inductor having a primary winding connected on its negative end to said negative terminal and a secondary winding connected on its negative end to said positive terminal and sharing a common magnetic core;
   c. a lamp load including a diode and fluorescent lamp connected in series with said secondary winding whereby said secondary winding may release stored energy to said lamp in only one current direction and may cyclically store energy when the load current would otherwise tend to flow in an opposite direction;
   d. an oscillator network adapted to cyclically energize said inductor secondary winding in one direction and then to allow said energy to be discharged from said secondary winding into said lamp in another direction whereby to energize said lamp, said network including:
      1. a transistor having base, emitter and collector electrodes;
      2. a current transformer having a primary winding with its positive end connected to said emitter electrode and its negative end connected to said dual inductor primary positive, said current transformer further having in series first and second secondary windings, the negative and positive ends of said first secondary winding being connected respectively to said emitter and base electrodes; and
      3. resistor-diode elements connected within said oscillator network whereby when said circuit is initially energized said transistor is turned on, energy is stored in all windings of said current transformer and inductor and upon the primary winding of said current transformer becoming saturated said transistor is reversed biased and is turned off and the energy stored in the secondary winding of said inductor is released to said lamp simultaneous with dissipation of energy from the primary winding of said current transformer and upon dissipation of said current transformer primary winding energy said transistor is turned back on and said cycle is repeated.

11. In a circuit as claimed in claim 10 including an elongated conductor element extending lengthwise of and adjacent said lamp and having one end connected to one side of said lamp and being effective as a capacitor to initiate partial ionization of the gas within said tube and substantially instant starting of said lamp upon energization of said circuit.

12. In a circuit as claimed in claim 10 wherein said current transformer primary winding energy is fully dissipated and said inductor secondary winding energy is only partially dissipated at the time said transistor is turned back on.

* * * * *

UNITED STATES PATENT OFFICE
CERTIFICATE OF CORRECTION

Patent No. 3,758,823  Dated September 11, 1973

Inventor(s) Preston L. Jett and James T. Hutchinson, Jr.

It is certified that error appears in the above-identified patent and that said Letters Patent are hereby corrected as shown below:

Col. 1, line 59, "exhibit" should be -exhibiting-.

Col. 2, line 5, "being" should be -behind-.

Col. 2, lines 7, 8, and 9, delete "the collector electrode represented by the angled line with arrowhead".

Col. 2, line 14, "not" should be deleted after the word "is".

Col. 2, line 22, "described" should be -describes-.

Col. 4, line 33, "ments" should be -ment-.

Col. 5, line 26, "storage" should be -voltage-.

Col. 6, line 59, "of" should be -to-.

Signed and sealed this 30th day of July 1974.

(SEAL)
Attest:

McCOY M. GIBSON, JR.
Attesting Officer

C. MARSHALL DANN
Commissioner of Patents